(12) United States Patent
Corallo

(10) Patent No.: US 10,428,928 B2
(45) Date of Patent: Oct. 1, 2019

(54) LUBRICATION SYSTEM FOR HIGH SPEED GEARBOX OPERATING IN ZERO GRAVITY

(71) Applicant: Hamilton Sundstrand Corporation, Charlotte, NC (US)

(72) Inventor: Roger Corallo, West Suffield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 250 days.

(21) Appl. No.: 15/468,482

(22) Filed: Mar. 24, 2017

(65) Prior Publication Data

US 2018/0274654 A1 Sep. 27, 2018

(51) Int. Cl.
*F16H 57/04* (2010.01)
*B64G 1/60* (2006.01)
*F16J 15/3232* (2016.01)
*F16H 1/20* (2006.01)

(52) U.S. Cl.
CPC ........... *F16H 57/0427* (2013.01); *B64G 1/60* (2013.01); *F16H 57/0471* (2013.01); *F16H 57/0472* (2013.01); *F16H 57/0495* (2013.01); *F16H 1/20* (2013.01); *F16H 57/0464* (2013.01); *F16J 15/3232* (2013.01)

(58) Field of Classification Search
CPC ............. F16H 57/0427; F16H 57/0428; F16H 57/043; F16H 57/0469; F16H 57/0471; F16H 57/0472
See application file for complete search history.

(56) References Cited

U.S. PATENT DOCUMENTS

| 2,487,350 | A | * | 11/1949 | Markland | ........... | F16H 57/0427 |
| | | | | | | 184/11.1 |
| 3,121,474 | A | | 2/1964 | Matt | | |
| 4,327,598 | A | * | 5/1982 | Yoneda | ..................... | F16H 3/08 |
| | | | | | | 184/11.1 |
| 4,592,558 | A | * | 6/1986 | Hopkins | .............. | F16J 15/3236 |
| | | | | | | 277/530 |
| 4,615,231 | A | * | 10/1986 | Takahashi | ........... | F16H 57/0427 |
| | | | | | | 74/467 |
| 4,715,244 | A | | 12/1987 | Byrd et al. | | |
| 4,848,177 | A | * | 7/1989 | Miura | ..................... | F16H 3/663 |
| | | | | | | 74/467 |
| 5,064,025 | A | * | 11/1991 | Richards | ............. | F16H 57/0427 |
| | | | | | | 184/11.1 |
| 5,626,470 | A | * | 5/1997 | Gerhardt | ............. | F04C 29/0021 |
| | | | | | | 184/6 |
| 5,810,116 | A | * | 9/1998 | Kaptrosky | .......... | F16C 33/6659 |
| | | | | | | 184/11.1 |
| 8,230,974 | B2 | | 7/2012 | Parnin | | |
| 8,381,878 | B2 | | 2/2013 | DiBenedetto | | |

(Continued)

*Primary Examiner* — Minh Truong
(74) *Attorney, Agent, or Firm* — Carlson, Gaskey & Olds, P.C.

(57) ABSTRACT

A system has an input shaft driving a first gear and supported by at least one input shaft bearing. The first gear drives at least a second gear. The second gear drives an output shaft. The output shaft is supported by at least one output shaft bearing. A gear bearing also supports at least one of the first and second gears. Lubricant movement structure is associated with at least one of the first and second gears for moving lubricant in an axial and in a radial direction to drive the lubricant toward at least one of the shaft bearing and the gear bearing. A spacecraft is also disclosed.

10 Claims, 4 Drawing Sheets

(56) References Cited

U.S. PATENT DOCUMENTS

| | | | |
|---|---|---|---|
| 9,404,381 B2 | 8/2016 | NguyenLoc et al. | |
| 2002/0141862 A1* | 10/2002 | McEwen | F01D 25/18 415/111 |
| 2004/0182647 A1* | 9/2004 | Watanabe | F16H 57/0427 184/11.4 |
| 2005/0115770 A1* | 6/2005 | Sandrart | B64C 27/12 184/6.2 |
| 2008/0014804 A1* | 1/2008 | Asakaze | B63H 20/002 440/49 |
| 2008/0128208 A1* | 6/2008 | Ideshio | B60K 6/52 184/6 |
| 2008/0135370 A1* | 6/2008 | Gooden | F16D 25/123 192/113.34 |
| 2015/0045163 A1* | 2/2015 | Botez | F16H 57/043 474/91 |
| 2015/0089918 A1 | 4/2015 | Valva et al. | |
| 2015/0233464 A1* | 8/2015 | Wiens | F16C 33/6666 184/6.12 |
| 2016/0010562 A1 | 1/2016 | Sheridan | |
| 2016/0032827 A1 | 2/2016 | Sheridan et al. | |
| 2016/0160686 A1 | 6/2016 | Cigal | |
| 2016/0186608 A1 | 6/2016 | Cigal et al. | |
| 2016/0222888 A1 | 8/2016 | Sheridan | |
| 2016/0290492 A1* | 10/2016 | Hattori | F16H 57/082 |

\* cited by examiner

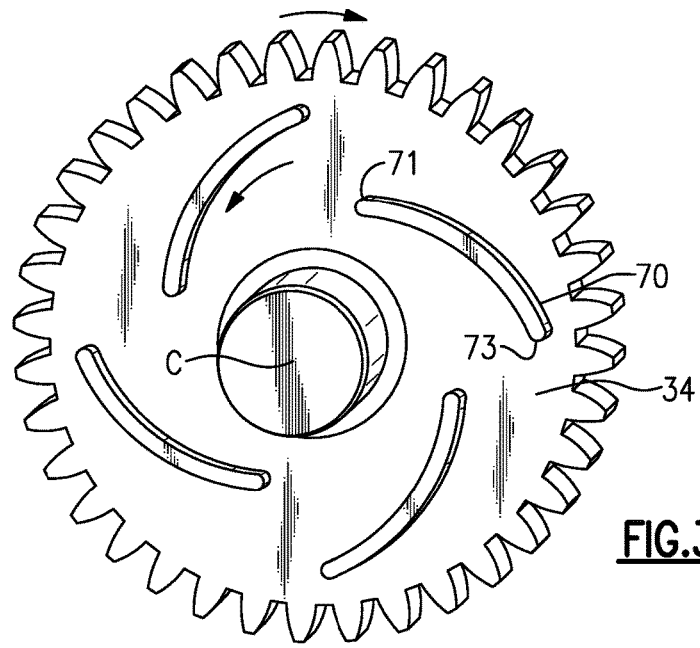
FIG.3A
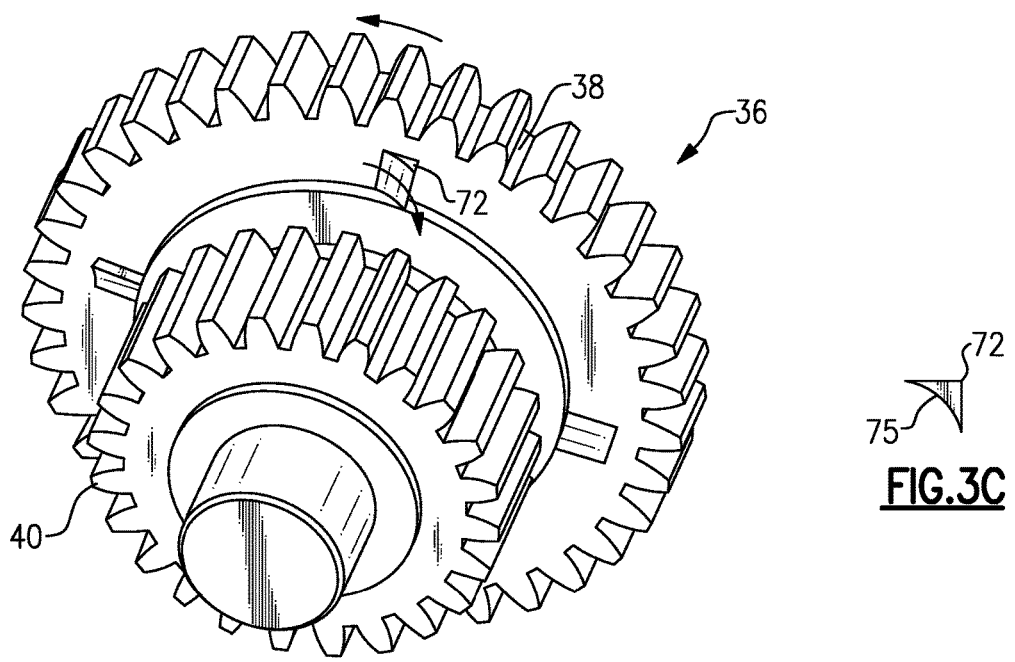
FIG.3B
FIG.3C

LUBRICATION SYSTEM FOR HIGH SPEED GEARBOX OPERATING IN ZERO GRAVITY

STATEMENT REGARDING FEDERALLY SPONSORED RESEARCH OR DEVELOPMENT

This invention was made with government support under Contract No. NNH16C087C awarded by NASA. The Government may have certain rights in this disclosure.

BACKGROUND OF THE INVENTION

This application relates to a lubrication system for ensuring adequate bearing lubrication even in zero, or very low, gravity environments.

Gearboxes are known and utilized in any number of applications. One particular application is to transfer rotation from a first shaft to a second shaft. Typically, the gears and the shafts must all be mounted in bearings.

Especially in high speed applications, the gears and bearings must be provided with adequate lubrication. Traditional bearing lubrication systems have relied on gravity to redistribute lubricant back onto the gear teeth and bearings.

However, in space applications, the lubrication systems must operate in zero, or low, gravity. The gravity drive of the traditional systems is not available.

SUMMARY OF THE INVENTION

A system has an input shaft driving a first gear and supported by at least one input shaft bearing. The first gear drives at least a second gear. The second gear drives an output shaft. The output shaft is supported by at least one output shaft bearing. A gear bearing also supports at least one of the first and second gears. Lubricant movement structure is associated with at least one of the first and second gears for moving lubricant in an axial and in a radial direction to drive the lubricant toward at least one of the shaft bearing and the gear bearing.

A spacecraft is also disclosed.

These and other features may be best understood from the following drawings and specification.

BRIEF DESCRIPTION OF THE DRAWINGS

FIG. 3A shows a first lubricant driving feature.

FIG. 3B shows a second lubricant driving feature.

FIG. 3C shows a detail of the FIG. 3B feature.

DETAILED DESCRIPTION

Figure 1:
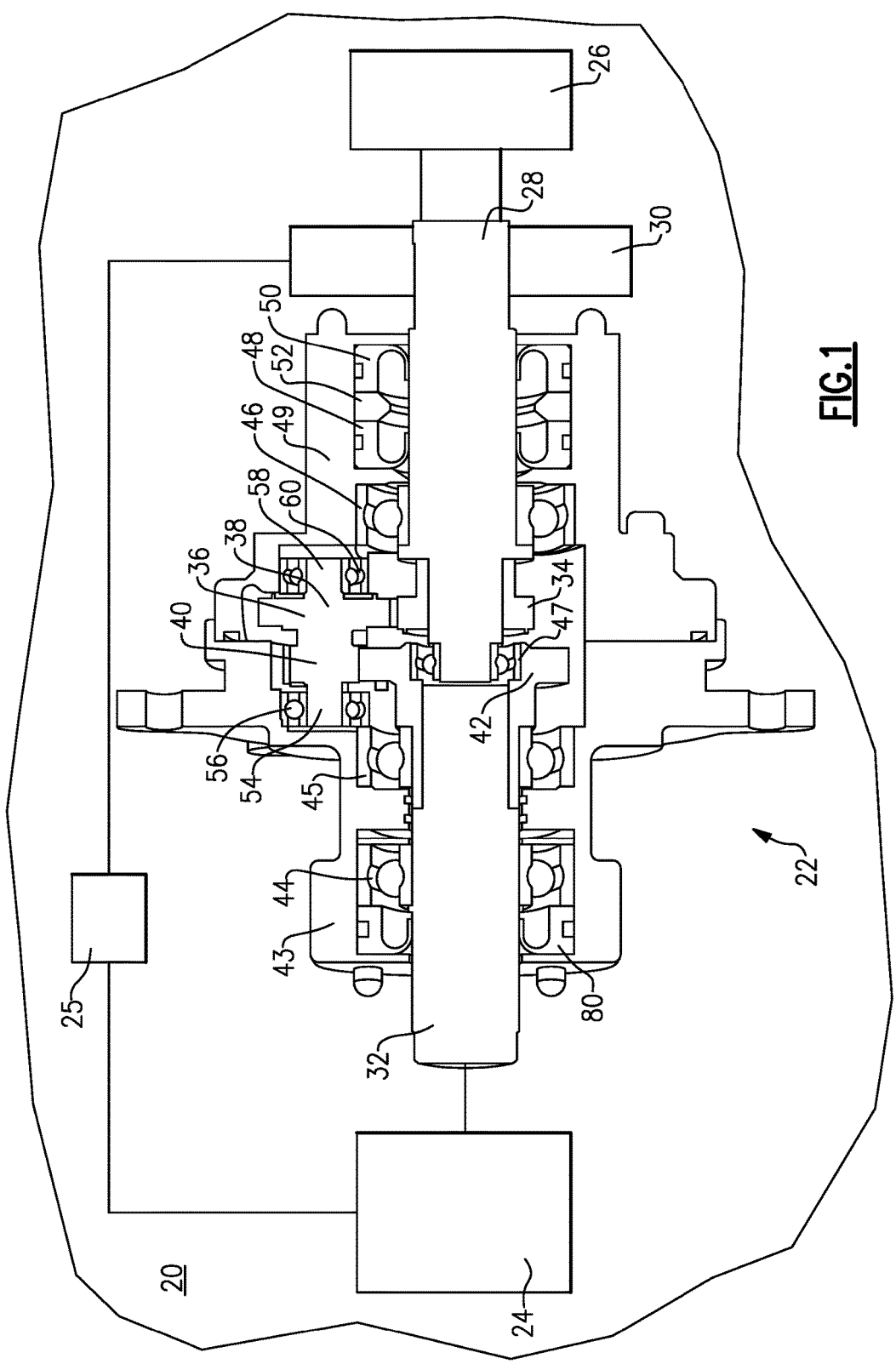
FIG. 1 shows a system for driving components operating on a spacecraft.

A spacecraft 20 is provided with a system 22 having a urine separator and pump 24 to drive a urine separator for a toilet 25 that will be utilized on the manned spacecraft 20. An input motor 26 drives a first input shaft 28. A fan 30 is mounted on the shaft 28 and operates at a first speed to remove vapor from the toilet 25 associated with the urine separator. The details of operation of the urine separator, vapor removing fan 30, and toilet 25 may be as known.

The input shaft 28 rotates at a distinct speed than an output shaft 32 which drives the urine separator pump 24. A gear system includes a first input gear 34, which is mounted on the rotational axis of the shafts 28 and 32, and which drives a gear 36. Gear 36 has a first gear portion 38 rotating with a second gear portion 40. Gear portion 40 engages an output gear 42 which, in turn, drives shaft 32. A bearing 44 sits within an output housing 43 and supports the shaft 32.

Another bearing 45 sits radially outwardly of a shaft portion of the gear 42 and also supports shaft 32. A bearing 47 sits radially inwardly of the gear 42 and also supports an inner end of the input shaft 28. A bearing 46 also supports the shaft 28 and sits within an output housing 49.

Output housing 49 includes two lip seals 48 and 50 which have U-shaped internal cavities which will be described below. An intermediate circulation spacer 52 sits between the seals 48 and 50, as will be explained below. A shaft portion 54 of the gear 36 is supported on bearing 56. A second shaft portion 58 of the gear 36 is supported on bearing 60.

As mentioned above, all of these bearings require lubrication during operation. Lubricant is provided in all chambers and spaces having a bearing. This disclosure utilizes shaft rotation to assist in circulating oil or grease.

Figure 2:
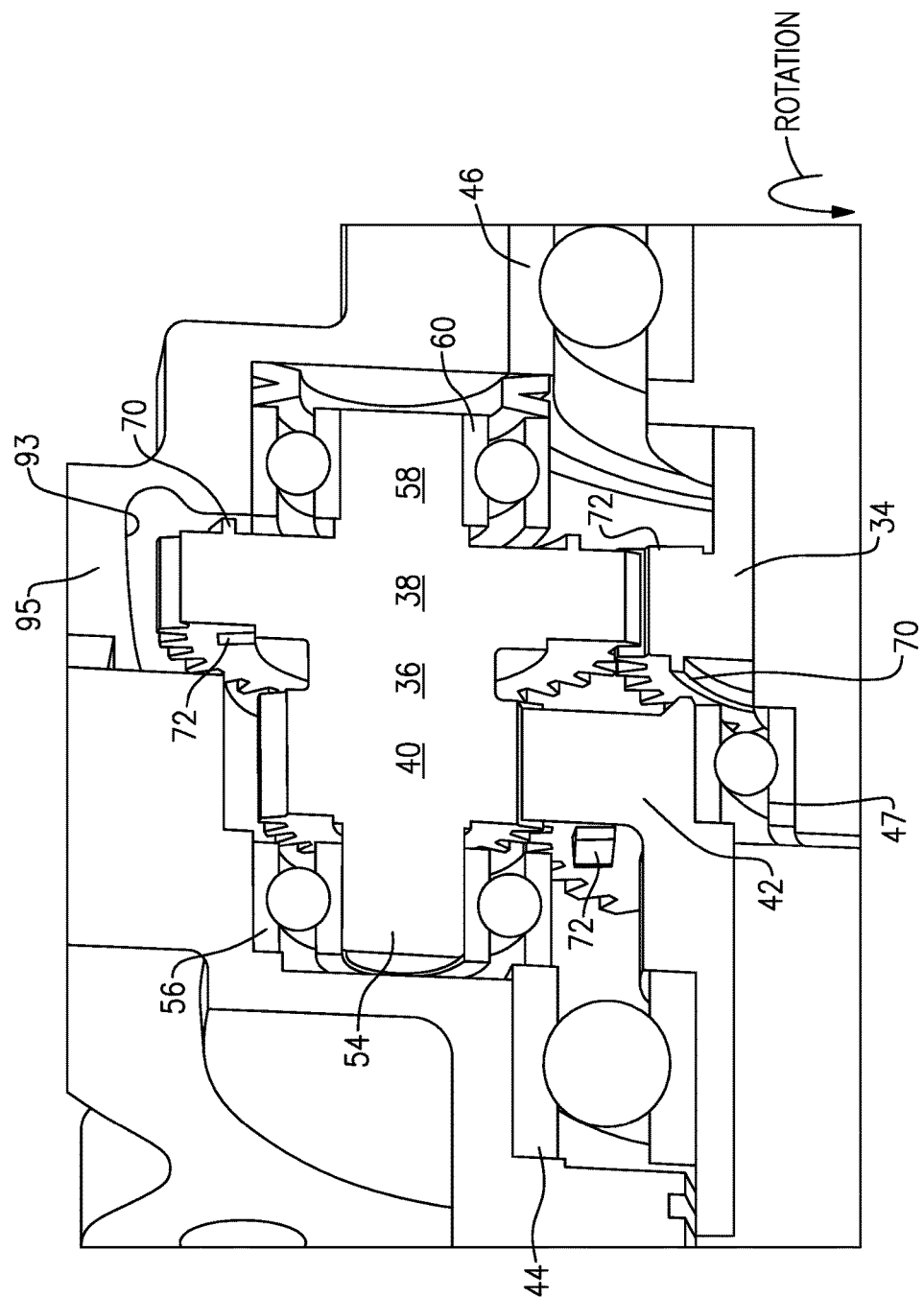
FIG. 2 shows a detail of a gear portion of the FIG. 1 system.

FIG. 2 shows details of how lubrication occur across the three gears 34, 36, and 42. Gear 34 is provided with a first lubrication movement or driving structure 70 which drives lubricant radially inwardly toward the bearing 47. An opposed face of the gear 34 is provided with an axial flow lubricant driving structure 72 which drives lubricant toward the bearing 46. The gear portion 38 on gear 36 is provided with axial flow structure 72 driving lubricant to the bearing 56. An opposed side of the gear portion 38 is provided with a radial flow driving structure 70 driving lubricant to the bearing 60. The gear 42 is provided with an axial lubricant flow driving structure 72 which drives lubricant to the bearing 44.

A channel 93 is formed in a housing 95 outwardly of gear portion 38 to recirculate lubricant back onto roots of the gear.

FIG. 3A shows details of the radial lubricant movement or driving structure 70. As shown, the gear 34 is rotating in the clockwise direction in this figure. An upstream end 73 of the radial driving structure 70 is spaced further radially outwardly from a center C of the gear 34 than is a downstream end 71 of the radial lubricant driving structure 70. In this manner, as shown, lubricant will be forced radially inwardly when the gear 34 rotates.

FIG. 3B shows a detail of the axial lubricant movement or driving structure 72. In this arrangement, the gear 40 is rotating in a counterclockwise direction and the structure 72 is operable to drive lubricant axially, as illustrated.

FIG. 3C shows a detail of the axial lubricant driving structure 72. As shown, an upstream end 75 is provided with a curved or ramped surface which will encounter the lubricant and force it in an axial direction when the gear 40 is rotating.

While the structures have been explained on gears 34 and 38, the radial and axial lubricant driving structures on each of the gears 34, 36, and 42 may all be structured as shown in FIGS. 3A and 3B.

Figure 4B:
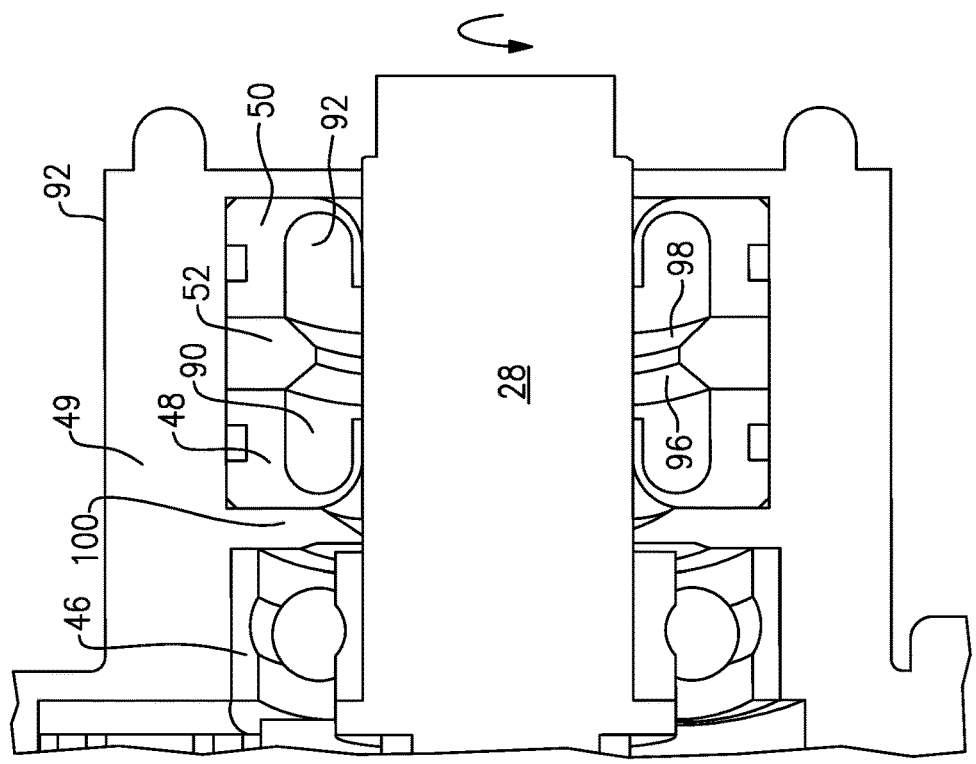
FIG. 4B shows a second end housing.
Figure 4A:
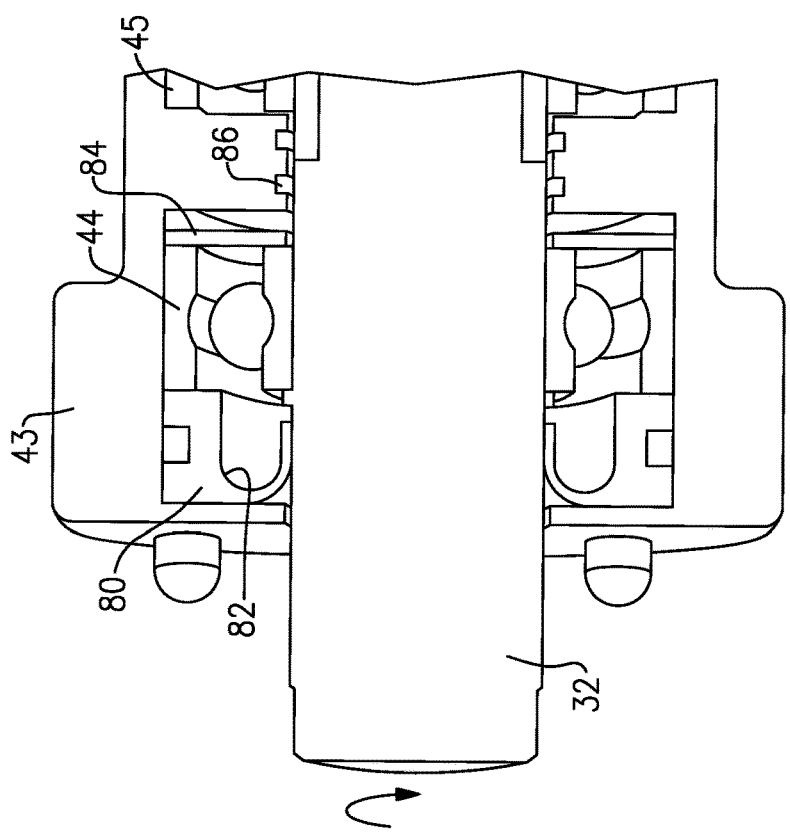
FIG. 4A shows a first end housing.

FIG. 4A shows details of the end housing 43. As shown, a seal 80 is positioned outwardly of bearing 44 and has a U-shaped seal cavity 82 facing the bearing 44. A barrier disc 84 is placed on an opposed side of the bearing 44 from seal 80. Labyrinth seals 86 are on an opposed side of the disc 84 relative to the bearing 44. In this manner, lubricant is retained between the seal cavity 82 and the bearing 44 and the disc 84. Further, the lubricant is caused to move in a direction through the seal cavity 82 and back toward the bearing 44.

FIG. 4B shows the opposed housing 49. Here, the lip seals 48 and 50 have U-shaped seal cavities 90 and 92 which face each other. It is desirable to provide a gas proof seal, as the captured vapor from fan 30 must be prevented to move to the inhabited space of the space vehicle 20. On shaft 28, seals 48 and 50 provide a redundant seal configuration. This is used at a critical leakage application. The ciruclation spacer 52 is used to re-circulate the oil or grease in this dual seal compartment.

The circulation spacer 52 has ramped sides 96 and 98. As the shaft 28 rotates, there is viscose drag and entrapped lubricant is driven off of the ramped sides 96 and 98 such that the lubricant circulates into the cavities 90 and 92.

The overall structure is operable to maintain and ensure adequate lubrication across the system 22.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system comprising:
  an input shaft driving a first gear and supported by at least one input shaft bearing, said first gear driving at least a second gear, and said second gear driving an output shaft, said output shaft being supported by at least one output shaft bearing, and a gear bearing supporting at least one of said first and second gears, and there being a lubricant movement structure associated with at least one of said first and second gears for moving lubricant in an axial and in a radial direction to drive the lubricant toward at least one of said shaft bearing and said gear bearing;
  wherein a radial lubricant movement structure includes a curved surface with an upstream end in a direction of rotation, which is spaced further radially outwardly from an axis of rotation of said at least one gear than is a downstream end, such that lubricant is moved radially inwardly by said radial lubricant movement structure when said at least one gear rotates;
  wherein an axial lubricant movement structure is formed on at least one of said gears and has a ramped surface on a face which is in an upstream direction when said at least one gear is rotating, such that lubricant is driven in an axial direction upon rotation on said at least one gear;
  wherein said radial lubricant movement structure and said axial lubricant movement structure are both formed on a single one of said gears;
  wherein there are a plurality of radial lubricant movement structures and a plurality of said axial movement structures in said system; and
  wherein said first gear driving a third gear which is, in turn, engaged to drive said second gear and there being at least one of said radial lubricant movement structure or said axial movement structure associated with each of said first, second, and third gears.

2. The system as set forth in claim 1, wherein said second gear being provided with said axial lubricant movement structure to drive lubricant to a bearing supporting said second gear.

3. The system as set forth in claim 2, wherein said first gear being provided with said radial lubricant movement structure to move lubricant radially inwardly to said at least one input shaft bearing and said first gear also being provided with an axial lubricant movement structure to move lubricant to a second input shaft bearing.

4. The system as set forth in claim 3, wherein said third gear being provided with an axial lubricant movement structure to move lubricant to a first bearing supporting said third gear and also being provided with a radial lubricant movement structure for moving lubricant to a second bearing supporting said third gear.

5. The system as set forth in claim 1, wherein there being output housing through which said output shaft extends, said output housing being provided with a seal at an outer end having a U-shaped cavity facing said at least one output shaft bearing, and capturing lubricant to lubricate said at least one output shaft bearing.

6. The system as set forth in claim 1, wherein said input shaft extends through an input housing having a pair of seals with U-shaped cavities facing each other.

7. The system as set forth in claim 6, wherein there is an intermediate circulation spacer positioned between said facing seals in said input housing.

8. The system as set forth in claim 7, wherein said circulation spacer having ramped sides on inwardly facing surfaces and facing said input shaft, such that upon rotation of said input shaft, lubricant is driven off said ramped sides and into said U-shaped cavities on each of said facing seals.

9. The system as set forth in claim 1, wherein said input shaft driving a first fluid movement device positioned outwardly of a housing including said first and second gears, and said output shaft driving a second fluid movement device positioned outwardly of said housing.

10. A spacecraft comprising:
  a toilet system with an input shaft driving a first gear and supported by a pair of input shaft bearings, said first gear driving at least a second gear, and said second gear driving an output shaft, said output shaft being supported by at least two output shaft bearings, and gear bearings supporting at least one of said first and second gears, and there being a lubricant movement structure associated with at least one of said first and second gears for moving lubricant in an axial and in a radial direction to drive the lubricant toward at least one of said shaft bearings and said gear bearings; and
  said input shaft driving a fan for moving vapor from said toilet system and said output shaft driving a pump that is part of an urine separator;
  wherein a radial lubricant movement structure includes a curved surface with an upstream end in a direction of rotation, which is spaced further radially outwardly from an axis of rotation of said at least one gear than is a downstream end, such that lubricant is moved radially inwardly by said radial lubricant movement structure when said at least one gear rotates;
  wherein an axial lubricant movement structure is formed on at least one of said gears and has a ramped surface on a face which is in an upstream direction when said at least one gear is rotating, such that lubricant is driven in an axial direction upon rotation on said at least one gear;
  wherein there are a plurality of said radial lubricant movement structures and a plurality of said axial movement structures in said system;
  wherein said first gear driving a third gear which is, in turn, engaged to drive said second gear and there being at least one of said radial lubricant movement structure or said axial movement structure associated with each of said first, second, and third gears; and wherein said radial lubricant movement structure and said axial lubricant movement structure are both formed on a single one of said gears.

\* \* \* \* \*